Oct. 25, 1955
D. SCIAKY
2,721,922
METHOD AND APPARATUS FOR WELDING BY HIGH FREQUENCY CURRENTS
Filed Aug. 10, 1950
3 Sheets-Sheet 1
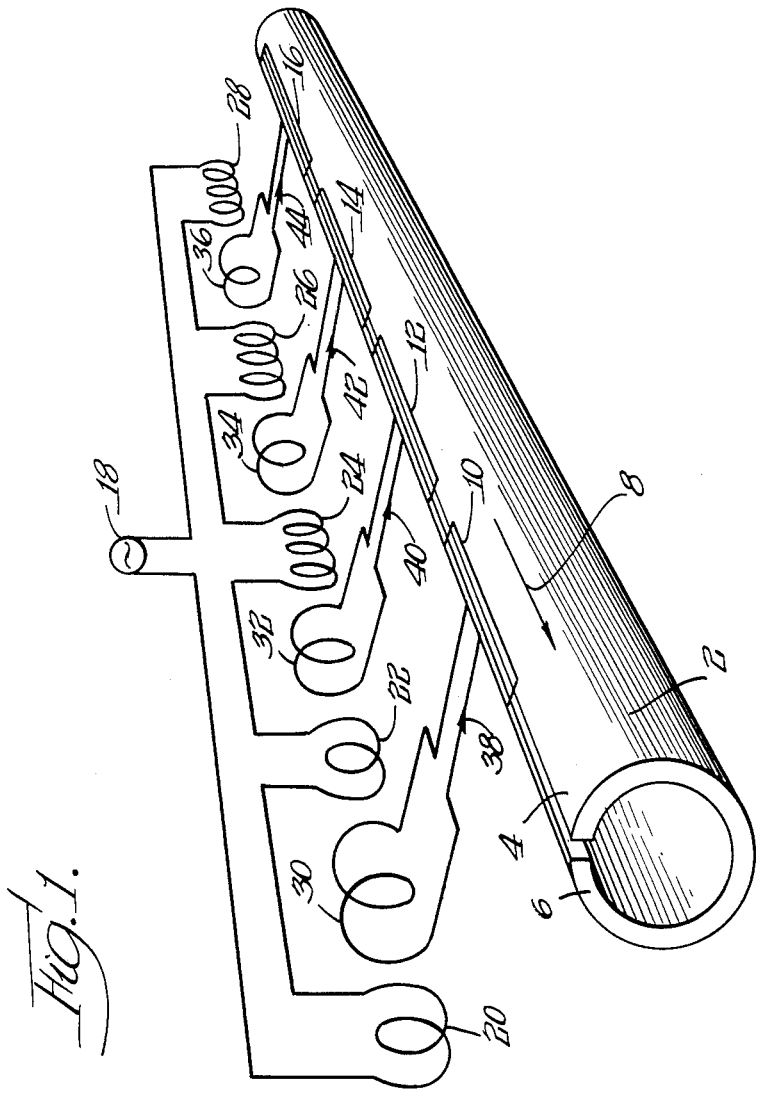
INVENTOR.
David Sciaky
BY
Moore, Olson & Trexler
attys.

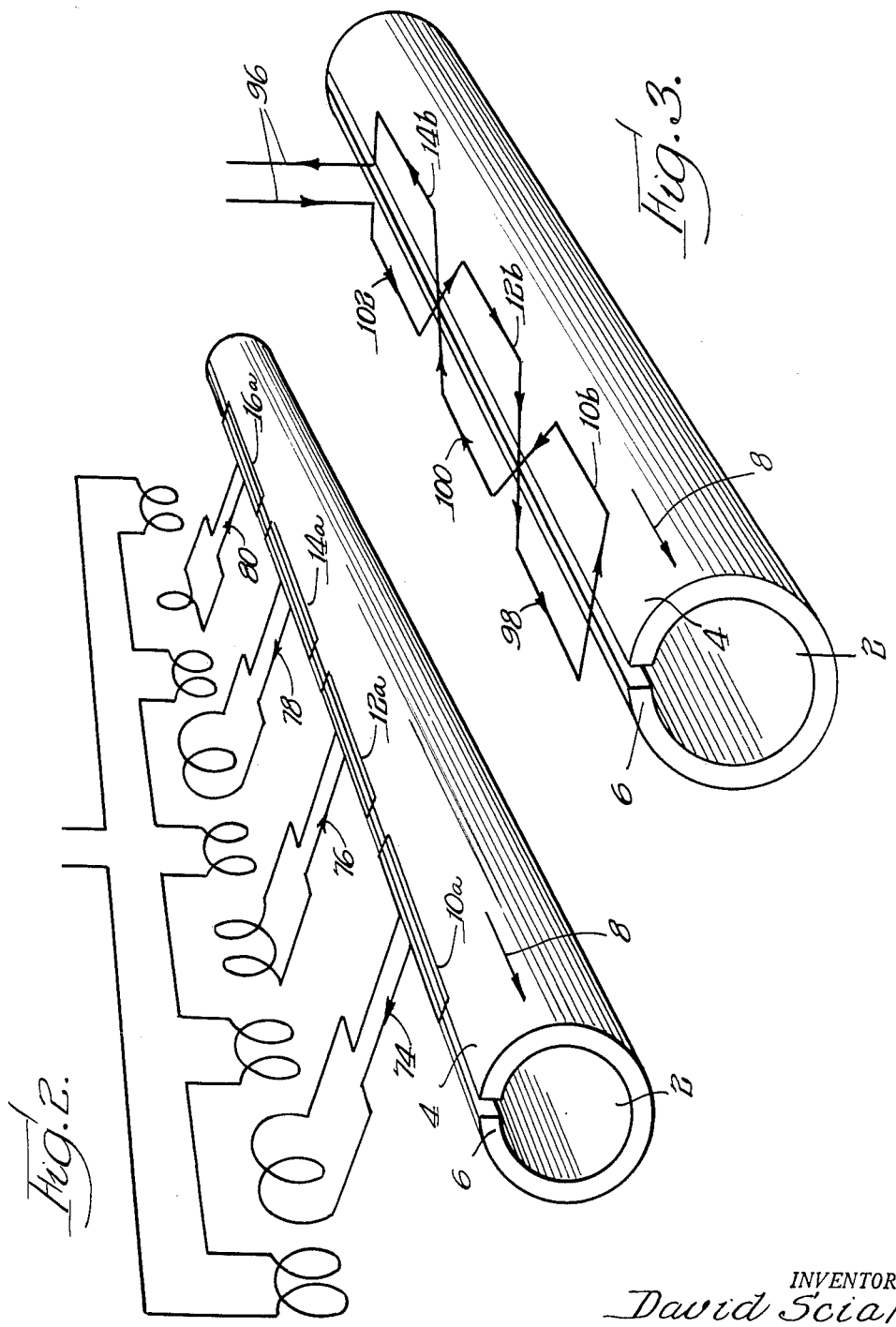

Oct. 25, 1955    D. SCIAKY    2,721,922
METHOD AND APPARATUS FOR WELDING
BY HIGH FREQUENCY CURRENTS
Filed Aug. 10, 1950    3 Sheets-Sheet 3
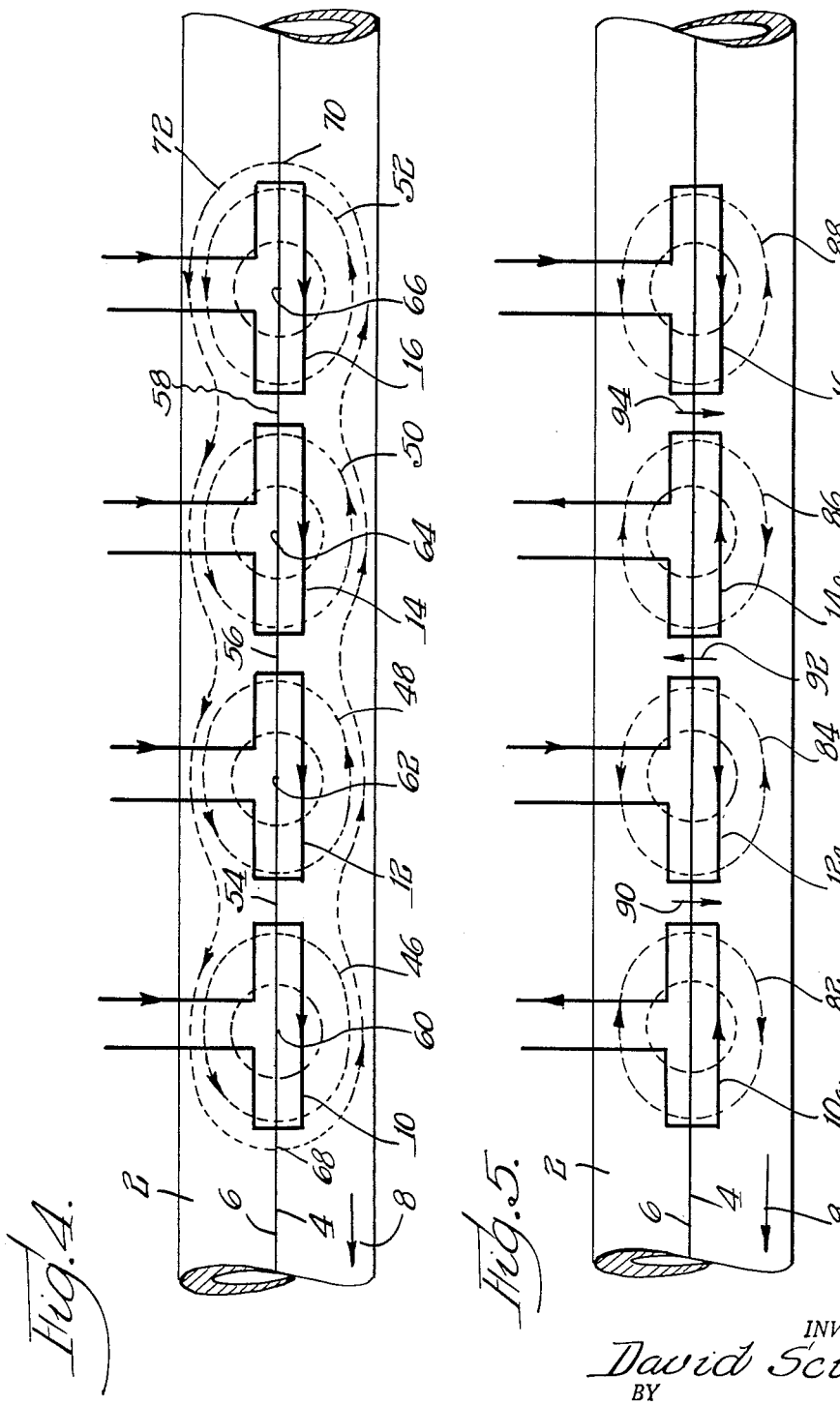
INVENTOR.
David Sciaky
BY
Moore, Olson & Trexler
attys.

United States Patent Office 2,721,922
Patented Oct. 25, 1955

2,721,922

METHOD AND APPARATUS FOR WELDING BY HIGH FREQUENCY CURRENTS

David Sciaky, Chicago, Ill., assignor to Welding Research, Inc., Chicago, Ill., a corporation of Illinois Application August 10, 1950, Serial No. 178,664

8 Claims. (Cl. 219—6)

This invention relates to methods and means for electric welding, and particularly to welding by the use of high frequency currents. More specifically, the invention concerns methods and apparatus for effecting high speed production, by welding, and wherein various types of articles, including those having relatively rough engaging surfaces to be welded, may be handled with facility.

Welding means are known in which the weld is obtained by the induction of high frequency current into the pieces to be welded, by means of a spiral induction coil supplied with high frequency current and placed in proximity to the parts to be welded. Such devices induce into the region to be welded a high frequency current which progressively increases and then decreases, as the activating current within the coil is applied, or as the displacement between the coil and the piece to be welded is varied.

Machines of this type present certain disadvantages and inconveniences, and notably the following:

(a) The quality of the weld is improved when the welding zones are submitted sucessively or periodically to impulses of current of high intensity. However, the above mentioned conventional devices, as now used, do not permit the work metal to be submitted to such successive or intermittent current impulses because, as previously indicated, the current near the weld is merely progressively increased or then decreased in respect to the work.

(b) Furthermore, in the installations heretofore known for electric welding which utilize high frequency currents induced in an activating spiral coil juxtaposed to the work parts to be welded, the said coil is necessarily placed very close to the work parts to be welded; and to insure that the heating will be sufficiently intense it is necessary to employ very high frequencies and very large currents. Because of such very high frequency the drop in voltage is very large, and high voltage drops are set up between the work parts and the ends of the circuit conductors. As the metal work pieces are at white heat, and since the distances between the work and the coil are very small, sparks or arcs may occur particularly in the case of rough work pieces between the work and the circuit conductors which may thus be rapidly deteriorated.

Further, because of the high intensity of the currents, there is a risk of localized overheating being produced within the activating coil, despite the cooling created by the circulation of water on the inside of the spiral, with the result that the result constituting the spiral coil, and the conductor parts, may frequently melt or become perforated.

Hence, in conventional known devices, in an attempt to avoid the foregoing difficulties it frequently becomes necessary to leave the work parts to be welded long enough at a time in juxtaposition to the activating spiral coil so that sufficient heating can be effected, by the use of lower current intensities. This, however, results in a relatively slow speed of production.

The present invention has as its particular object the remedying of the foregoing difficulties and inconveniences.

To this end the invention relates to a high frequency electrical welding process, and apparatus, characterized in that high frequency currents are induced in the work parts to be welded at successive spaced points in relation to a displacement of the work pieces in a particular direction, so that a given point of the piece or pieces to be welded is subjected successively, due to the displacement of the piece, to successive impulses of induced current; this arrangement thus effecting the welding by subjecting the work pieces to be welded to sucessive intermittent impulses.

The present invention relates to such processes, and also to devices or apparatus for effecting the processes, and hereinafter certain preferred particular apparatus will be set forth. Such apparatus, providing a particularly simple and effective employment of the preceding process, or a similar process, is characterized by loops, traversed by the high frequency current, arranged in spaced relation, and placed in proximity to the parts to be welded successively in the direction of their displacement, so that because of such displacement and the arrangement provided, the different points of the work pieces to be welded are submitted successively to the current induced by the loops successively traversed by the high frequency current.

The invention applies also to the characteristics hereinafter described, and to the various possible combinations thereof. In the drawings the invention has been shown applied to the welding of tubing, to which it has particular applicability, but it is to be understood that the process and apparatus may be used with various work pieces and parts to be welded.

Certain preferred welding installations conforming to the invention are shown, by way of example, in the attached drawings in which:

Fig. 1 represents, in perspective, the arrangement of the loops traversed by high frequency currents, and the means for effecting the electrical feeding thereof, in accordance with one preferred embodiment and arrangement of the invention;

Fig. 2 represents another embodiment of methods and apparatus for effecting a welding operation of the character illustrated in Fig. 1;

Fig. 3 represents still another apparatus and method embodiment for carrying out the invention;

Fig. 4 represents, schematically, the electromotive forces induced in the work pieces, in accordance with the installation of Fig. 1; and Fig. 5 represents the electromotive forces induced in the work pieces, in accordance with the installations of Figs. 2 or 3.

Referring more particularly to the drawings, in accordance with the invention, in Fig. 1 the work piece or pieces to be welded is illustrated as a tube 2 having juxtaposed or abutting edges 4 and 6 to be welded together to form the welded tubing. During the welding operation the tube is propelled or moved axially in a direction as indicated by the arrow 8, for a purpose as will presently appear. The apparatus comprises a plurality of loops 10, 12, 14 and 16, of which there may be any desired number, traversed by the high frequency current. These loops are sufficiently close to the tube edges 4 and 6 so that the currents induced in the tube are sufficiently great to effect the welding operation. The loops are fed from a common generator 18 by coupling loops 20, 22, 24, 26 and 28 supplied in series from the generator, with loops 30, 32, 34 and 36 supplying, respectively, each of the welding loops 10, 12, 14 and 16. In the device of Fig. 1 the welding loops 10, 12, 14 and 16 are fed, at any given instant, in the same direction, for example as indicated by the arrows 38, 40, 42 and 44. Hence, referring to Fig. 4, it will be seen that the currents induced in the tube represented by broken lines in Fig. 4 and by the reference numerals 46, 48, 50 and 52 all have the same direction. As a result, the currents induced between each of the loops 10, 12, 14 and 16, on the tube seam 4—6 to be welded, are in the opposite directions. They therefore substantially cancel or neutralize each other in pairs at their juxtaposed portions so that there is substantially no current in the zones disposed between the loops indicated by the numerals 54, 56 and 58. However, each individual loop has its own point of maximum intensity as indicated at 60, 62, 64 and 66 which together with the points 68 and 70 where the general or additive flux transverses the tube seam provide a series of spaced points successively traversed by each work part or work part portion to be welded, thus subjecting such work parts to successive and intermittent heating impulses to effect the welding operation.

In accordance with the embodiment of Fig. 2, the welding loops 10a, 12a, 14a and 16a, corresponding to the loops 10, 12, 14 and 16 of the previous embodiment, are in this instance fed in the opposite direction, loop 10a, receiving, at a given instant, a current represented by the arrow 74, while the following loop 12a is fed at the same instant in the other direction, as indicated by the arrow 76. Likewise, loop 14a is fed in the same direction as loop 10a as indicated by arrow 78, whereas loop 16a is fed in the same direction as loop 12a, as indicated by the current direction arrow 80.

Referring to Fig. 5, indicating the electromotive forces in the installation of Fig. 2, it will be seen that the currents induced by each of the loops 10a, 12a, 14a and 16a are in the opposite direction in the adjacent or succeeding loops, as indicated, respectively, at 82, 84, 86 and 88. The induced currents are therefore in the same direction in the zones disposed between each pair of adjacent loops, as indicated at 90, 92 and 94, so that the calorific effects are added to each other, and concentrated zones or points of high intensity are provided in succession along the path of travel of the work piece. These zones, together with the lesser zones provided individually by the loops thus provide spaced points successively traversed by each work part portion to be welded, so as to subject such portion to successive and intermittent heating impulses to effect the welding operation.

Fig. 3 represents another method in realization of the invention, wherein the successive loops as indicated at 10b, 12b and 14b are fed by a single conductor 96 whose wires cross, each crossing giving rise to the formation of a loop.

It can be seen, by reference to arrows 98, 100 and 102, that the passage of current at any given instant is in opposite directions in each pair of adjacent or successive loops; so that the installation of Fig. 3 gives circulating currents of the same character as in the installation of Fig. 2, and as heretofore described in reference to Fig. 5.

It is obvious that various changes may be made in the specific embodiments of the invention set forth for purposes of illustration without departing from the spirit of the invention. The invention is accordingly not to be limited to the specific embodiments shown and described, but only as indicated in the following claims.

The invention is hereby claimed as follows:

1. An apparatus for electric welding a moving workpiece by high frequency current, said apparatus providing a welding path along which a work piece may be propelled in predetermined direction, a plurality of air core induction coils arranged along said path with their axes intersecting the path substantially perpendicularly in spaced relation therealong, said coils being disposed in proximity to the work piece with opposite ends of each intermediate coil disposed adjacent the welding path, and means for effecting a preselected high frequency directional energization of said coils to predetermine the current characteristics between adjacent ends of intermediate coils, whereby the work piece upon movement along said path is subjected successively to induced current by successive coils to effect the welding thereof by successive induced current impulses.

2. An apparatus for electric welding a moving work piece by high frequency current, said apparatus providing a welding path along which a work piece may be propelled in predetermined direction, a plurality of air core induction coils arranged along said path with their axes intersecting the path substantially perpendicularly in spaced relation therealong, said coils and each adjacent end thereof being disposed in proximity to the work piece and the welding path, and means comprising a common power source for effecting the high frequency energization of said coils in predetermined directional relation to each other to predetermine the current characteristics between adjacent ends of the coils, whereby the work piece upon movement along said path is subjected successively to induced current by successive coils to effect the welding thereof by successive induced current impulses.

3. An apparatus for electric welding a moving work piece by high frequency current, said apparatus providing a welding path along which a work piece may be propelled in predetermined direction, a plurality of air core induction coils arranged along said path with their axes intersecting the path substantially perpendicularly in spaced relation therealong, said coils being disposed in proximity to the work piece, and means comprising a common power source and a plurality of coupling coils in series with the power source and disposed between adjacent induction coils for effecting the high frequency energization thereof, whereby the work piece upon movement along said path is subjected successively to induced current by successive coils to effect the welding thereof by successive induced current impulses.

4. An apparatus for electric welding a moving work piece by high frequency current, said apparatus providing a welding path along which a work piece may be propelled in predetermined direction, a plurality of air core induction coils arranged along said path in proximity to the work piece and with their axes intersecting the path substantially perpendicularly in spaced relation therealong, and means for effecting the high frequency energization of said coils with adjacent coils simultaneously energized in the same direction so that the induced currents between said coils are substantially neutralized to provide zones of maximum current intensity substantially at the center of each coil, whereby the work piece upon movement along said path is subjected successively to induced current by successive coils to effect the welding thereof by successive induced current impulses.

5. An apparatus for electric welding a moving work piece by high frequency current, said apparatus providing a welding path along which a work piece may be propelled in predetermined direction, a plurality of air core induction coils arranged along said path in proximity to the work piece and with their axes intersecting the path substantially perpendicularly in spaced relation therealong, and means for effecting the high frequency energization of said coils with adjacent coils simultaneously energized in opposite directions so that the induced currents between said coils are added to provide spaced zones of maximum current intensity between sets of adjacent coils, whereby the work piece upon movement along said path is subjected successively to induced current to effect the welding thereof by successive induced current impulses.

6. An apparatus for electric welding a moving work piece by high frequency current, said apparatus providing a welding path along which a work piece may be propelled in predetermined directions, a plurality of air core induction coils formed from a single electrical conductor and arranged along said path in proximity to the work piece and with their axes intersecting the path substantially perpendicularly in spaced relation therealong, and means for effecting the high frequency energization of said coils, whereby the work piece upon movement along said path is subjected successively to induced current by successive coils to effect the welding thereof by successive induced current impulses.

7. An apparatus for electric welding a moving work piece by high frequency current as claimed in claim 6, wherein the electrical conductor forming the coils is twisted upon itself to provide adjacent spaced loops.

8. An apparatus for electric welding as defined in claim 1, wherein said induction coils are composed of a plurality of individual electric conductors energized from a common power source.

References Cited in the file of this patent

UNITED STATES PATENTS

| | | |
|---|---|---|
| 1,365,199 | Sessions | Jan. 11, 1921 |
| 1,932,423 | Sessions | Oct. 31, 1933 |
| 1,939,452 | Kachel | Dec. 12, 1933 |
| 2,209,637 | Sessions | July 30, 1940 |
| 2,465,306 | Durand | Mar. 22, 1949 |
| 2,475,348 | Black | July 5, 1949 |
| 2,552,514 | Bowlus | May 15, 1951 |
| 2,632,092 | Cachat et al. | Mar. 17, 1953 |